United States Patent [19]
Mead

[11] 3,950,663

[45] Apr. 13, 1976

[54] INLINE MOTOR IRON AND WINDINGS

[76] Inventor: John A. Mead, E. Charlemont Road, Shelburne Falls, Mass. 01370

[22] Filed: May 23, 1974

[21] Appl. No.: 472,597

[52] U.S. Cl................. 310/49 R; 310/112; 310/156
[51] Int. Cl.² ...................................... H02K 37/00
[58] Field of Search............. 310/112, 49, 162–164, 310/152–156

[56] References Cited
UNITED STATES PATENTS

| | | | |
|---|---|---|---|
| 3,549,918 | 12/1970 | Croymans et al.............. | 310/112 X |
| 3,693,034 | 9/1972 | Inariba................................ | 310/49 |

*Primary Examiner*—Donovan F. Duggan

[57] ABSTRACT

In stepping and synchronous inductor motors, rotor poles, which partially overlap stator poles at the usual annular working air gap, are successively coerced by magnetic fluxes emanating from stator windings disposed in line with the machine axis and between iron pieces. Magnetomotive vectors rotate around and reciprocate along the axis. Novel arrangements of iron pieces and their pole configurations aggregate classic reaction forces around the air gap periphery. Power is supplied by pulse trains or single and polyphase alternating current.

10 Claims, 36 Drawing Figures

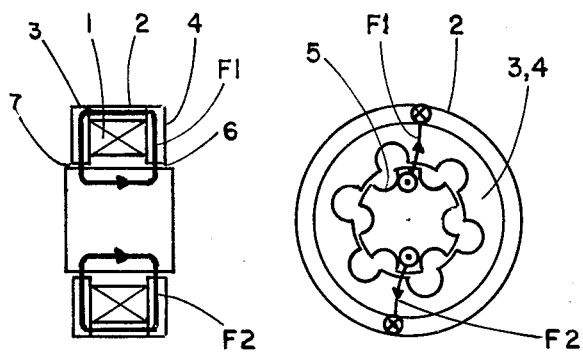
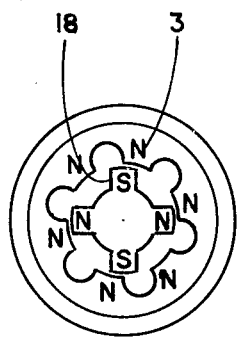
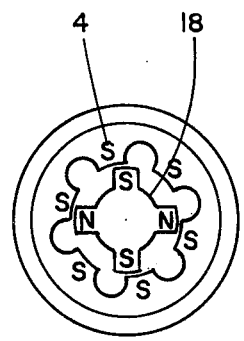
FIG. 1    FIG. 2    FIG. 3    FIG. 3a
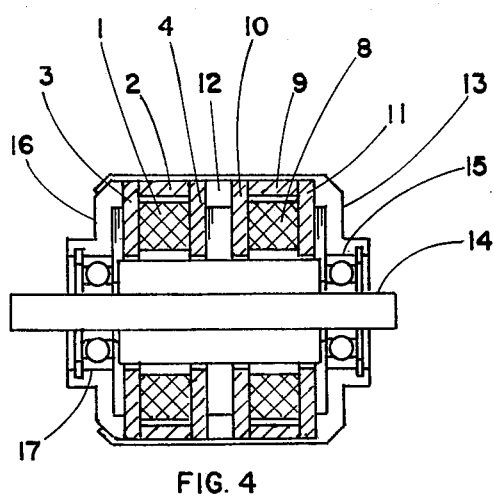
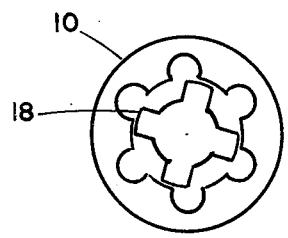
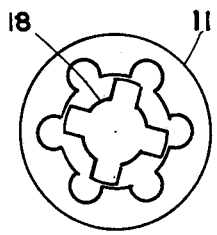
FIG. 4    FIG. 6    FIG. 6a
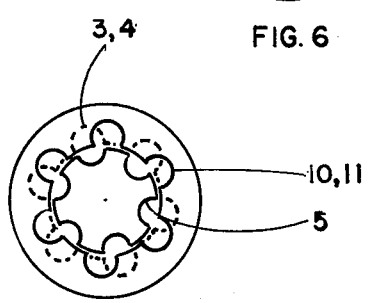
FIG. 5
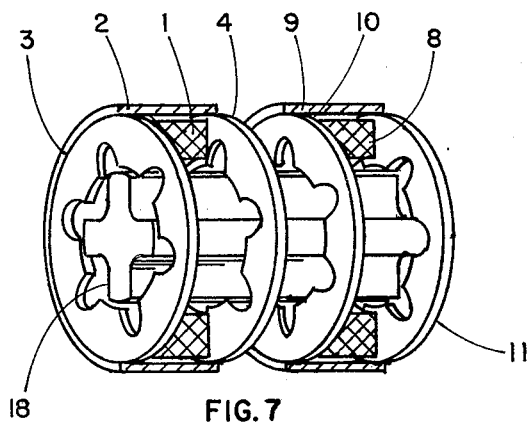
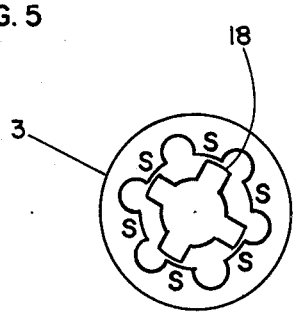
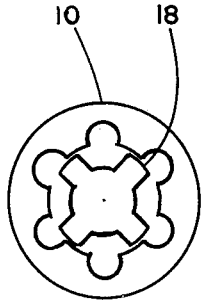
FIG. 7    FIG. 8    FIG. 9
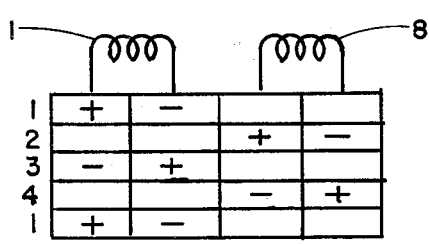
FIG. 10

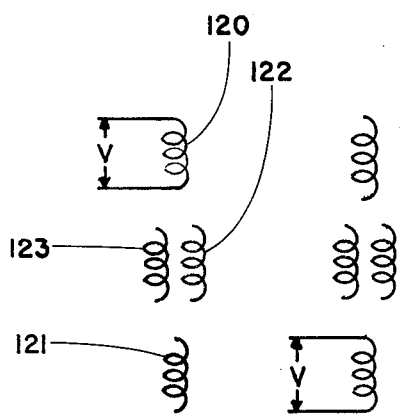 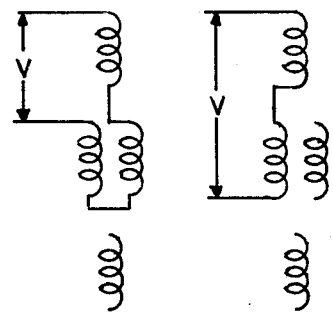
FIG. 24  FIG. 24a  FIG. 25  FIG. 25a
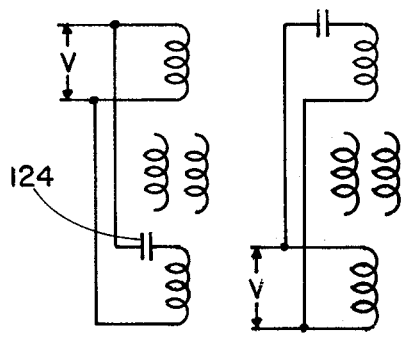 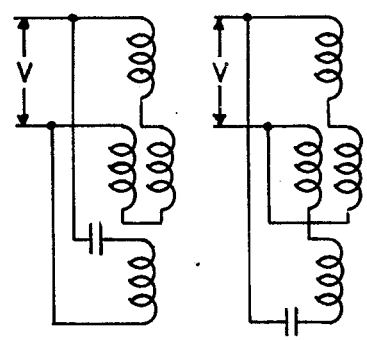
FIG. 26  FIG. 26a  FIG. 27  FIG. 27a
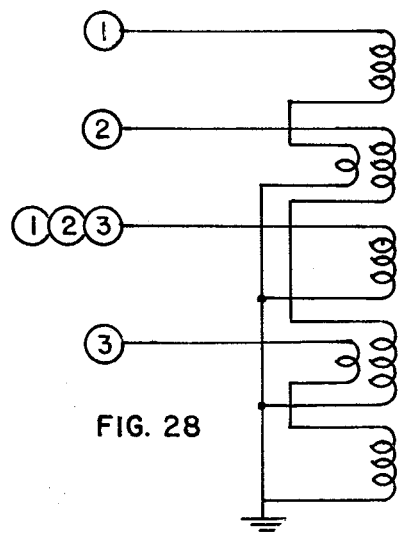
FIG. 28

INLINE MOTOR IRON AND WINDINGS

OBJECTS

The subject device is constructed to step a number of times in the completion of one cycle of input pulses during which the rotor traverses an arc equal to one pole and notch of a stator iron piece. Flux circuits are arranged so that stator iron pole pieces are free of windings, comprise a full complement of poles for establishing number of steps per revolution and are easily replaceable. A prime object is to design a rotor with a small number of poles that can be used in a motor having a relatively large number of steps per revolution. Another object is to provide a construction in which a small assortment of major subassemblies can make up a completed motor in many combinations and in which coils and iron pieces are easily interchanged and simply fabricated. Still another object is to present a design in which permanent magnet rotor faces cover as little or as large a total arc as the application dictates while all their teeth retain full effectiveness on every motor step. A further object is to present an array of stator laminates to discourage eddy currents and to introduce shaded pole operation. Still a further object is to develop an arrangement for placing stator iron and for switching winding connections so that some coils are used in more than one step of the cycle.

SUMMARY

This invention is presented by developing first the flux sources and flux carrying pieces for a single stator element and then polyphase motor structures using more than one element with through rotor. Variable reluctance operation is discussed, but operation utilizing a permanent magnet rotor is emphasized since the letter leads to special rotor constructions which optimize torque-to-inertia ratio. Mention is made periodically of practical considerations for commercial usage as novel structures for iron pole and winding arrangements are explained.

DESCRIPTION OF THE DRAWINGS

FIG. 1 is a cross section of a motor element showing the path of stator fluxes.

FIG. 2 is an end section showing rotor-to-stator pole interfaces for iron rotor.

FIGS. 3 and 3a are comparable to FIG. 2 for permanent magnet rotor.

FIG. 4 is a side elevation in section that shows a two-element package.

FIG. 5 is an end section showing pole interfaces for the second element of FIG. 4 for iron rotor.

FIGS. 6 and 6a are is comparable to FIG. 5 for permanent magnet rotor.

FIG. 7 is an isometric cutaway showing an iron pole arrangement for permanent magnet rotor.

FIG. 8 is an end section for step 3 of permanent magnet operation.

FIG. 9 is an end section for step 4 of permanent magnet operation.

FIG. 10 is a table showing power to windings of FIG. 7 for the 4 steps of permanent magnet operation.

FIGS. 24 and 24a show electrical schematics for one winding shaded pole unit.

FIGS. 25 and 25a show electrical schematics for two-winding shaded pole unit.

FIGS. 26 and 26a show power connections for split-phase A.C. unit.

FIGS. 27 and 27a show power connections for three-winding A.C. unit.

FIG. 28 shows power connections for three-phase V.R. unit.

DESCRIPTION OF THE STRUCTURE

Figure 11:
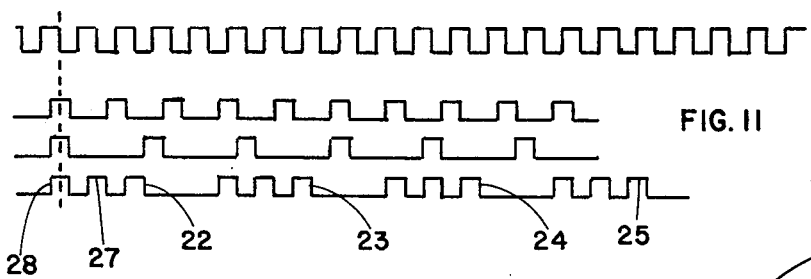
FIG. 11 is a developed plan of rotor-to-stator pole patterns.

Although the following disclosures offered for public dissemination is detailed to ensure adequacy and to aid understanding, this is not intended to prejudice that purpose of a patent which is to cover each new inventive concept therein no matter how others may later disguise it by variations in form or addition or further improvements.

This invention incorporates magneto-mechanical forces coacting between rotor and stator poles at the working air gap that separates them, which forces are well known to those schooled in the art of stepping motors as exemplified in U.S. Pat. No. 2,982,872. It is part of this invention that a special rotor-to-stator pole configuration develop these forces in a manner to improve operation and reduce cost of such devices. Also in this invention stator windings that furnish temporary fluxes are disposed axially and apart from stator iron pieces that carry radial fluxes selectively to their pole lands at the air gap. These stator iron wafer pieces are thereby free to contain a full complement of poles for establishing the number of steps per revolution for the machine and thus permit the number of poles in the rotor to be chosen separately and minimized according to the novel methods to be described.

FIG. 1 shows a magneto-mechanical element with its toroidally shaped flux path through magnetic pieces as delineated in section by flux lines $F_1$ and $F_2$ emanating from an electric current which has been made to pass temporarily through stator winding 1. The stator comprises winding 1 surrounded on its outside by iron barrel 2 and on its end faces by iron wafers 3 and 4; which wafers are in surface contact with barrel 2 in order to facilitate the passage of magnetic fluxes. The rotor is rotatably mounted within the stator by housing and bearing members that are not shown. A typical flux line $F_1$ travels longitudinally outward through air gap 6, radially further outward through wafer 4, back longitudinally through return barrel 2, radially inward through wafer 3 and finally radially and further inward across air gap 7 back to the rotor. FIGS. 2 and 3 show sections through a wafer at either end of the element of FIG. 1 wherein the rotor is formed with a plurality of outer embossments or poles facing the working air gap and each stator wafer is formed with a number of lands extending inwardly to face the air gap with intervening notches that subtend the same arc as each other and as the lands.

FIG. 2 depicts usage as a Variable Reluctance motor wherein rotor and stator poles number the same and the rotor being of ferromagnetic material simply seeks a position of least reluctance as it lies within the total magnetic field of winding 1 which position is that of alignment for rotor and stator poles. In FIG. 2 wafers 3 and 4 are pictured with their poles or lands oriented in line and $F_1$ and $F_2$ are shown as they travel up toward the reader in rotor 5, cross the working air gap from rotor to stator and return into the paper via barrel 2 as rotor 5 is posed to start a torque step toward its pull-in position of pole alignment. FIG. 4 illustrates a typical construction of two elements wherein the stator pieces of FIG. 1 are repeated and the rotor extends straight into and through winding 8 which is characteristically surrounded on the outside by iron barrel 9 and on its sides by wafers 10 and 11. These two stator elements are spaced apart by separator 12 of non-magnetic material, and enclosed in housing 13, also of non-magnetic material, which at one end supports rotor shaft 14 through bearing 15 and at the other likewise supports shaft 14 through end cap 16 and bearing 17. For Variable Reluctance operation FIG. 5 shows rotor 5 poles extended under the pole lands of wafers 3 and 4 (shown dotted) of the first element as a result of winding 1 have been energized. As rotor 5 now comes under the influence of a magnetic field resulting from winding 8 being energized, its poles will take another step into alignment with the lands of wafers 10 and 11, which lands are also oriented in line but staggered somewhat less than half a land-pitch from those of 3 and 4. Variable Reluctance operation will be described further when reference is made to FIGS. 16 and 17.

With regard to motor operation utilizing a rotor of permanent magnet material, hereinafter known as PM rotor operation, the flux paths $F_1$ and $F_2$ are traced as delineated above for the single element of FIG. 1. FIGS. 3 and 3a show sections through wafers at both ends of this element, wafer 3 in FIG. 3 and wafer 4, which is staggered one-half stator pole or land pitch from wafer 3, in FIG. 3a. Rotor 18 comprises salient poles numbering ⅛ less than lands of its two coacting wafers, which poles are permanently magnetized with alternate polarity as shown in FIG. 3 giving rise to transverse flux paths connecting adjacent rotor poles through the air gap and arc sectors of stator wafers. To better comprehend the interaction of magnetic field forces at the working air gap, polarities are assigned to the pole lands of wafers 3 and 4 such as shown in FIG. 3 as winding 1, having been temporarily energized, sets up fluxes $F_1F_2$. Thus a torque step 1 commences with rotor 18 in the position of FIG. 3. FIG. 4 is used again to show a typical construction for PM rotor operation with the rotor extending into a second element composed of winding 8 and its associated stator iron pieces 9, 10 and 11. FIG. 7 shows this two-element arrangement in isometric section with stator iron wafers 3, 4, 10 and 11 in their regular position for PM rotor operation and rotor 18 in position for the start of torque step 1. Wafers 10 and 11 are oriented ½ stator land pitch apart as are 3 and 4 but staggered ¼ pitch relatively in the direction of rotor movement or, in this case, clockwise. Windings 1 and 8 are repeated schematically below FIG. 7 in FIG. 10 which is a truth table showing winding connections with their polarity of excitation for the four phases or torque steps in PM rotor operation. Torque step 1 concludes after rotor 18 is coerced through an arc length of ¼ stator land pitch or 15° and is pulled characteristically into position where some pole faces align with stator lands of opposite polarity and intervening faces align with notches. As winding 1, having been energized per line 1 of FIG. 10, is deenergized and winding 8 is energized per line 2 of FIG. 10, torque step 2 commences as shown in FIGS. 6 and 6a with wafer 10 in FIG. 6, wafer 11 in FIG. 6a, and rotor 18 in its appropriate relative position one torque step clockwise from its position in FIG. 3. Rotor 18 now experiences torque step 2 under the influence of the magnetic field emanating from winding 8, moves through another arc length of ¼ stator land pitch, and pulls into the position where it is shown in FIG. 8; which position is ½ stator land pitch from the start of torque step 1 of FIG. 3. FIG. 8 also designates the start of torque step 3 with wafer 3 that commences with the deenergizing of winding 8 and the energizing of 1 per line 3 of FIG. 10 which connects winding 1 to an electrical voltage source of opposite polarity to that for the start of torque step 1 and thus causes wafer 3 and its lands to assume the polarity shown. FIG. 9 shows rotor 18 as torque step 3 ends and torque step 4 begins along with iron wafer 10 as element 2 is energized per line 4 of FIG. 10. During torque step 4, rotor 18 traverses another ¼ stator land pitch or 15° and, at the end, has pulled into a position one full stator land pitch removed from that for the start of torque step 1 and is thereby ready to be coerced by a new pattern of stator lands, which pattern is functionally identical with that of torque step 1 per FIG. 3. Thus after 4 successive winding excitations, the two-element PM rotor device is poised to repeat torquing the rotor for another 4-phase set of steps per lines 1 thru 4 of FIG. 10 and the rotor will travel another arc occupied by one stator land and notch. Thus the rotor will make one revolution when the steps amount to four times the number of stator lands or teeth. Because the rotor contains permanent magnets, it has appreciable holding force or detent in its pull-in positions with windings unenergized.

The above two-element device may also be powered by a two-phase or split-phase A.C. supply whereby fundamental line voltage is connected to winding 1 for steps 1 and 3 of FIG. 10 and the quadrature voltage is connected to winding 8 for steps 2 and 4.

Direction of rotor motion may be reversed by sequencing the pulsed excitation in reverse order; that is, rotor 18 may be driven counter clockwise by exciting windings 1 and 8 according to the manner FIG. 10 instructs from bottom to top.

Figure 12:
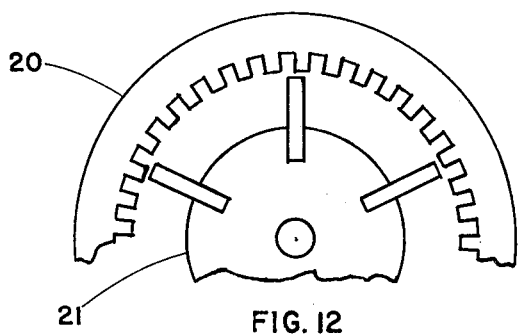
FIG. 12 is an end elevation layout showing rotor with few poles.
Figure 13:
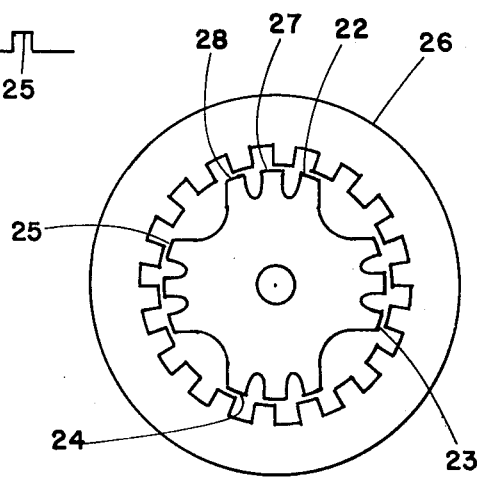
FIG. 13 is an end elevation layout showing wide rotor poles with subsalient teeth.

As shown in the figures denoting transverse sections, for instance FIG. 3, the bisector of a rotor pole being attracted at the start of a torque step coincides radially with the leading edge of its coacting stator poles while bisectors of its neighboring poles under repulsion pass through trailing edges of stator poles. The pole configuration of FIG. 3 provides that there occurs a temporarily ineffectual or uneventful stator pole across the air gap to one side of each attracted rotor pole (counterclockwise from each attracted rotor pole in FIGS. 3 and 3a) and no uneventful stator poles to the other side of each attracted rotor pole (clockwise from each attracted rotor pole in FIG. 3). Thus in the pole configuration described thus far for PM rotor operation rotor poles are equally spaced and two rotor poles and spaces occupy the same arc as three stator lands and notches. This arrangement is shown in development in FIG. 11 wherein the top row depicts stator lands facing downward and all rows below depict rotor poles facing upward. For the second row rotor pole pitch is seen to be 3/2 stator pole-pitch to fit the arrangement thus far described. Fundamentally, a complete machine must comprise an even number of equally spaced rotor poles and a whole number of equally spaced stator lands and notches. The third row of FIG. 11 depicts a spacing of rotor poles wherein one side of each rotor pole is occupied by two uneventful stator poles and the other side is occupied by one uneventful stator pole. The spacing of this row is such that rotor pole-pitch is 5/2 stator pole-pitch. This process of reducing the number of rotor poles by spreading them apart may continue for all practical values of rotor-to-stator pole pitch ratio having odd multiples of ½ while rotor poles remain equally spaced. In machines with relatively large numbers of steps per revolution, it may be advantageous to have a small number of rotor poles to facilitate fabrication of the rotor and to give it a small moment of inertia. For example, FIG. 12 represents the cross section of a motor whose stator 20 has 75 teeth for 300 steps per revolution and whose rotor 21 has six poles. Greater torque may be realized without increasing the number of magnet poles on the rotor by adding teeth to existing poles. For example, the configuration shown in FIG. 13 consists basically of a 4-pole permanent magnet rotor having teeth 22 thru 25, working with 18-tooth stator wafers 26. Two rotor teeth are then added to each rotor salient adjacent to the existing teeth such as the addition of teeth 27 and 28 alongside tooth 22. This rotor to stator layout is pictured in FIG. 11 by the fourth row with respect to the first. This expedient provides a more efficient use of stator iron at the expense of larger rotor inertia. In all configurations for this invention each rotor tooth or pole exerts its maximum effectiveness at every torque step.

Since the inline windings are functionally separated from the flux-carrying stator iron wafer pieces, the latter may be physically separable so as to be interchangeable with each other and with coils in stator subassemblies. Further interchangeability is permitted with various rotor constructions for given stator components and vice versa as demonstrated by FIGS. 11, 12, 13 and applicable descriptions. For example, rotor 21 of FIG. 12 could be formed with 10 poles instead of the 6 shown, or stator 20 of FIG. 12 could contain stator teeth numbering any odd multiple of one-half times number of rotor poles. The ease of fabricating (1) rotors with fewer poles, (2) stator pieces that lend themselves to punchings and (3) windings that are simply bobbin-wound coils should give rise to substantial cost reductions. An economical product line may be developed in which rotor subassemblies, stator wafers, and coils are stocked separately. Customer needs for different steps per revolution may be satisfied with only a change in stator wafers. The availability of these combinations of interchangeable subassemblies will facilitate meeting specific requirements with off-the-shelf items and will allow optimizing performance-versus-cost trade-offs. Uses in industry for this kind of stepper motor include numerically controlled machine tools and capstan drives for tape recorders.

Figure 14:
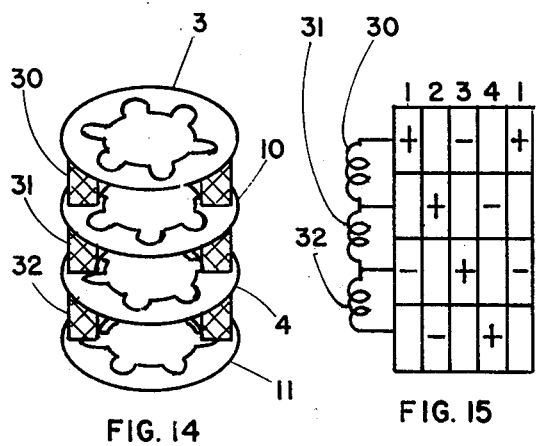
FIG. 14 shows a stator pole arrangement for 4-phase operation.
Figure 15:
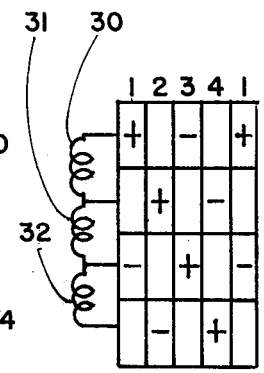
FIG. 15 tabulates power connections for FIG. 14.

FIG. 14 delineates a unique iron and winding configuration wherein coils 30 and 31 act in unison in place of winding 1 in FIG. 7 for steps 1 and 3 in the description above and coils 31 and 32 are likewise energized together in place of winding 8 for steps 2 and 4. The same through design of PM rotor is understood. With stator wafers 3 and 4 staggered in their axial location with respect to wafers 10 and 11 as shown in FIG. 14 and windings 30, 31 and 32 excited for four steps or phases as tabulated in FIG. 15, the stepping function of this configuration follows the description above using FIGS. 3, 6, 8, and 9. Since winding 31 is utilized in all four steps, copper usage is very efficient in that two-thirds of available ampere turns are at work at all times.

Figure 18:
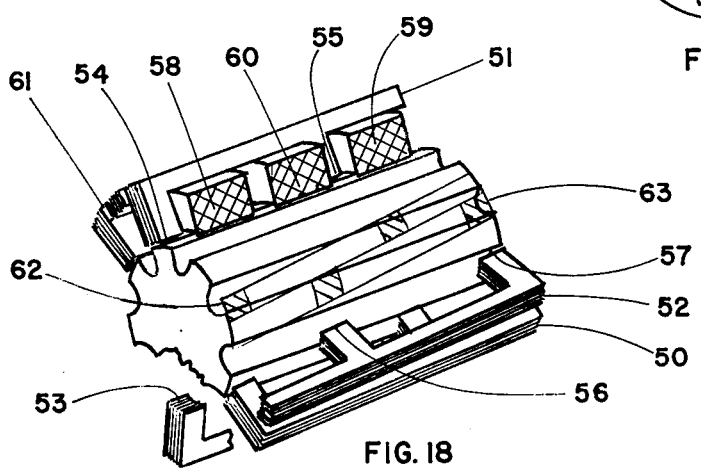
FIG. 18 depicts isometric sections of laminated construction.

In electromagnetic devices that utilize pulsating fluxes, losses due to eddy currents set up at right angles to flux flow may be minimized by laminating the flux-carrying material such that sheets of this material shaped as a portion of the path are stacked in a direction perpendicular to flux flow. In this manner each of the two elemental flux circuits of FIGS. 4 and 7 could have its two wafer end pieces and connecting iron barrel made up of C-shaped laminations stacked around the machine's periphery. For PM operation pieces 3, 4, and 2 of FIG. 7 could be replaced by a group 50 of laminations 51 in FIG. 18 and 10, 11 and 9 by more stacks 52 of laminations 51. Laminations are skewed and elongated so that an end face of each stack such as 53 forms a pole to face the straight splined rotor poles exactly as corresponding pole lands of wafers 3, 4, 10 and 11 face rotor 18 of FIG. 7. Lamination stacks have a height equal to the width of pole lands and notches of the stator wafer pieces of previous description. Stack end faces form poles in continuous flux circuits according to the foregoing discussion for FIG. 7 wherein lamination stack poles 54 and 55 along with kindred others replace stator pole lands of wafers 3 and 4 respectively being rotationally oriented one-half stator pole pitch apart and stack poles 56 and 57 et al. replace the lands of wafers 10 and 11 being also oriented one-half stator pole pitch apart but staggered one-quarter pole pitch from stack poles 54 and 55 respectively. Lamination stack poles facing the air gap such as 54 through 57 are illustrated in FIG. 18 by plane FIGS. 62 and 63 whose shaded portions represent projections of these poles onto the rotor surface. In particular, poles akin to 54 and 55 are shown in outline 62 and 56 and 57 in 63. Laminations 51 are pictured with an extension to the back of the C-shape, making them F-shape, simply to attain a mechanical continuity at the ends of the stator as stacks are assembled in alternate end-for-end orientation. Coil windings 58 and 59 in FIG. 18 serve the same function and may be identical to coils 1 and 8 of FIG. 7. Coil winding 60 is added to FIG. 18 to complete the configuration described above for FIG. 14 whereby coils 58 and 60 are excited together for steps 1 and 3 of FIG. 15 and coils 59 and 60 are excited together for steps 2 and 4. Spacings such as 61 required to position laminations may be provided by potting compound.

Figure 19:
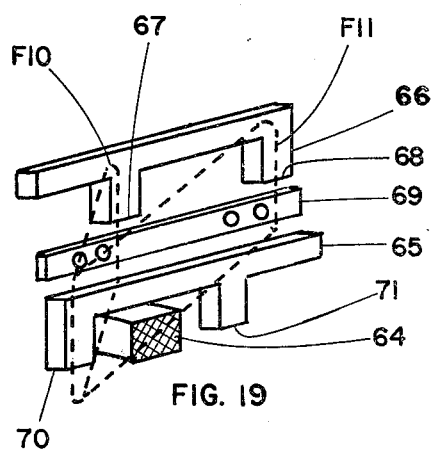
FIG. 19 shows blown-out stator pieces for shaded-pole scheme.
Figure 20:
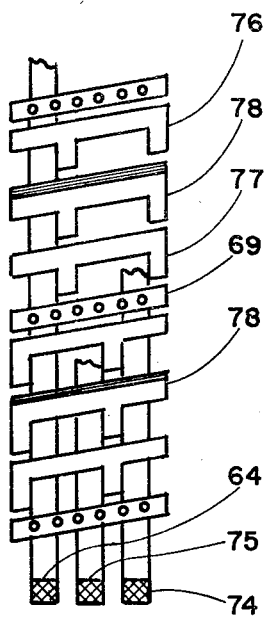
FIG. 20 is a developed diagram of laminated stator components for one-two, or three-winding operation.
Figure 21:
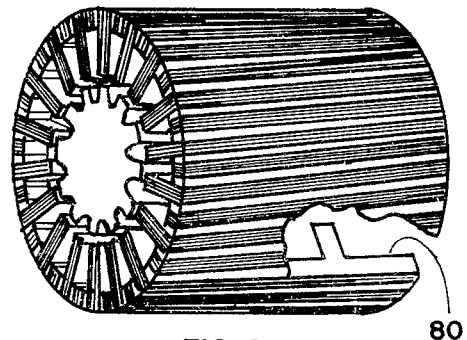
FIG. 21 is an isometric end elevation of a 72-step laminated unit.

In addition with regard to electromagnetic devices, a flux pulse is known to undergo a phase delay by virtue of being surrounded at some point along its path by a shorted turn of non-magnetic but electrically conducting material such as copper. Poles facing a working air gap in such a flux circuit are called shaded poles. FIG. 19 shows a stator element with flux due to current in coil 64 having a primary path through stator piece 65 and the usual straight splined permanent magnet rotor (not shown). Some flux may stray into alternate or secondary paths from piece 65 such as into neighboring piece 66 for closing through the rotor at its pole faces 67 and 68 as depicted by flux paths $F_{10}$ and $F_{11}$. These secondary fluxes in passing through the punched holes or slots in copper shading strip 69 are delayed such that fields are set up at pole faces 67 and 68 which lag those in pole faces 70 and 71 in time phase. When coil 64 is connected to a source of alternating current, the time and direction sequence for fluxes in paths containing pieces 65 and 66 will agree with FIG. 10 as poles 70 and 71 experience the fundamental wave of flux, in-phase per step 1 and out-of-phase per step 3, while poles 67 and 68 experience flux with a quadrature component per steps 2 and 4. FIG. 19 can be expanded to show a closed array of stator pieces alternately like 65 and 66, all separated by shading strips like 69, to the end that a stepping motor is configured which sustains motion unidirectionally as the four step motor depicted in FIGS. 4 and 7. FIG. 20 shows a sample of this array of stator pieces developed straight line for clarity of picturing to be utilized with one coil 64 according to FIG. 19. FIG. 20 also shows two thicknesses of stator iron pieces, the thick ones such as 76 and 77 are adjacent shading strips in order to transfer suitable amounts of flux crosswise and to stiffen the lamination stack as it extends toward the air gap. The thin laminations 78 take advantage of eddy current reduction according to FIG. 18. Shading strips 69 are shown with holes to provide many cross paths for flux in each. The inclusion of coil 74 allows this configuration to operate as a bidirectional shaded pole motor, either winding excited for either direction. In this second winding split phase may be supplied for two-phase A.C. operation. Windings 64 and 74 may also be excited as a four-phase stepping motor with input pulses per FIG. 10. The inclusion of a third winding 75 permits operation as described for FIGS. 14 and 15 wherein one coil, coil 75, is connected for use in every step. FIG. 21 is an isometric view that shows a plausible scale arrangement for the components of FIG. 20. In an 18-pole stator for a 72-step machine having a working gap diameter of 1 inch, each pole land (and valley) covers a circumferential arc of 0.088 inch. Each stack might consist of 10 laminations, each 0.006 thick, surrounded by two laminations, each 0.014 thick. Looking away from the gap, these stacks must pile together with shading strips interspersed per FIG. 20 at the root diameter 80 of the lamination sections carrying return flux parallel to the machine axis. If this root diamter is set at 1½ inches, the thickness of shading strips works out to 0.044 inch. Passage of flux through holes or slots in these strips may be encouraged by filling them with a magnetic epoxybase material. From the 1½ inch diameter where all pieces contact toward the outside, some pieces will flare apart making room for potting compound to encapsulate them together. Holes punched into the laminations will fill with this epoxy and help key them in place. Some of these holes may also be used for initially stringing laminations in sequence according to the proper array, for instance FIG. 20.

Figure 22:
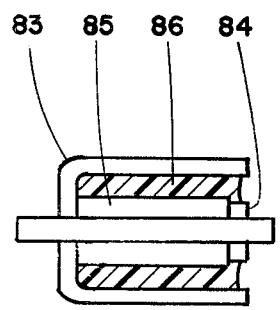
FIGS. 22 and 22a show longitudinal and cross sections for permanent magnet rotor structure.
Figure 22A:
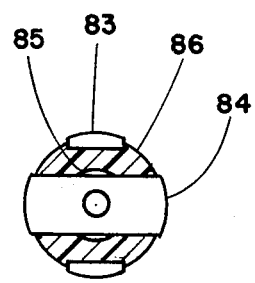

In order to accommodate pulsating fluxes required to close circuits such as $F_1$ $F_2$ in FIG. 1 resulting from momentary winding excitations, rotors in this invention designed for PM rotor operation are formed according to FIGS. 22 and 22a in which the four-pole construction for the subject embodiment is pictured in plan section in FIG. 22 and in cross section in FIG. 22a. Two U-shaped pieces of soft iron, 83 and 84, are connected at their bases to opposite ends of a right cylindrical permanent magnet 85, which has been magnetized along its length. Thus the rotor pole surfaces presented to the air gap are free to carry pulsating fluxes and, at the same time, are charged alternately around the rotors periphery with north and south permanent fields. To add structural rigidity the intervening spaces may be filled with epoxy compound 86.

In order to take advantage of fringe flux effects at the start of a torque step and at the unenergized detents, rotor pole faces are fashioned to overlap or cover at least 20 percent wider arc than coacting stator poles.

Figure 23:
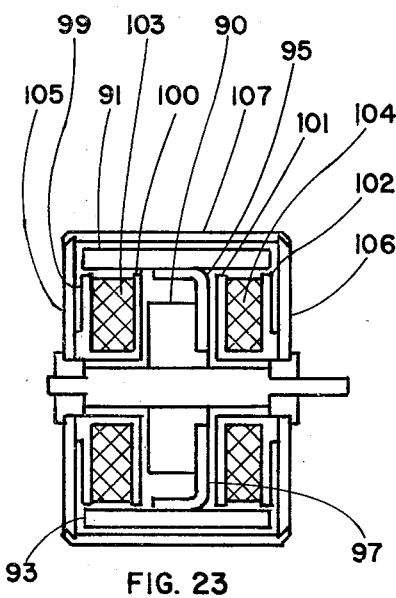
FIGS. 23 and 23a show longitudinal and cross sections of construction with the rotor outside.
Figure 23A:
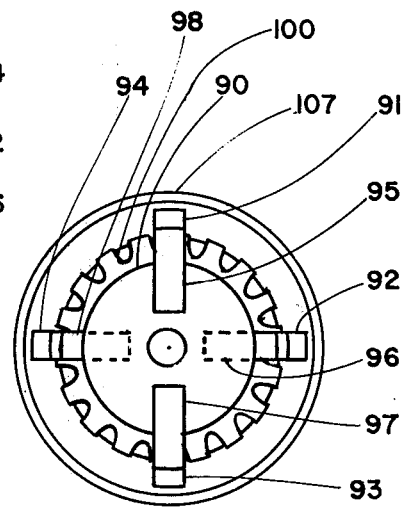

A counterpart to the embodiment thus far described for PM rotor operation is an inside-out version wherein the rotor surrounds the stator as pictured in FIGS. 23 and 23a. This construction utilizes a centrally located rotor 90, permanently magnetized along its length with pole shoes 91 through 94 connected alternately around its faces with straps 95 through 98; each shoe extending in both directions from the point of attachment over wafers 99 through 102 as shown. Each coil 103 and 104 is formed between two wafers into single element stator subassemblies which are secured to end plates 105 and 106 at both ends of housing 107. Assuming the same tangential forces at work in this as in the version of previous description, this latter provides more torque per unit power input by virtue of the relatively larger gap diameter and thereby may be useful as a low-energy clock motor.

The three-winding permanent magnet rotor unit depicted in FIGS. 20 and 21 can be powered to function in several modes of four-phase operation with A.C. sources. In FIGS. 24 through 27 electrical schematics for this unit are shown with end windings 120 and 121 full and the center winding composed of two coils 122 and 123. Taking advantage of the shaded pole feature, this unit may be driven in either direction by simply exciting one or the other end windings, 120 or 121 per FIG. 24 or 24a with A.C. voltage. Maximum torque with single phase excitation is available for unidirectional operation by exciting one end winding together with the whole of the center winding per FIG. 25. Bidirectional control is afforded by switching a single phase source from the connection shown in FIG. 25a to the complementary connection where voltage is supplied to coils 121 and 122. FIGS. 26 and 26a depict fundamental A.C. voltage being applied to one end winding and a quadrature or split phase voltage to the other by virtue of a capacitor 124 in series with the line. Power for one direction is shown in FIG. 26 and for the opposite direction in FIG. 26a. Again maximum torque is obtained in one direction by exciting the whole center winding along with one end with line voltage, augmenting the use of available power in this case by applying split phase to the other end as diagrammed in FIG. 27. For direct bidirectional switching, the line would first be connected to one end and half the center with split phase to the other end and the other half of the center per FIG. 27a and then connections switched for reversing. A more efficient use of windings is achieved with an electronic translater designed to switch the whole of the center winding to function first with one end and then with the other as tabulated in FIG. 15.

Figure 16:
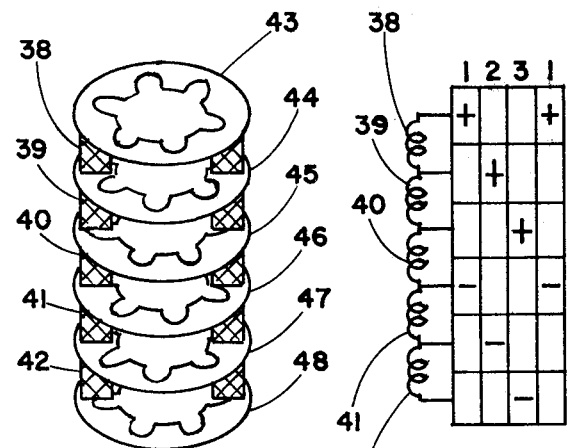
FIG. 16 shows a stator pole arrangement for 3-phase operation.
Figure 17:
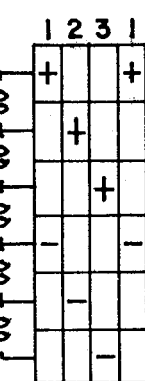
FIG. 17 tabulates power connections for FIG. 16.

Reverting now to variable reluctance operation, reference is made to FIG. 16 wherein a stator is shown for three-phase sequential stepping. Winding 38, 39, and 40 work together through the wafers which surround them, 43 and 46, for a first torque step with coil excitation per line 1 of the power connection table of FIG. 17. When the straight splines or poles of the iron rotor, not shown, have pulled in under the teeth of wafers 43 and 46, which teeth are oriented in line, excitation is switched to windings 39, 40, and 41 per line 2 of FIG. 17 for the start of a second torque step. Flux from the combined ampere-turns of these three windings passes through wafers 44 and 47, whose teeth are again oriented in line but staggered circularly ⅓ stator tooth-pitch from wafers 43 and 46. Wafers 45 and 48 have their teeth likewise in line and staggered ⅓ tooth-pitch in the direction of rotor movement from wafers 44 and 47 in order that, when the rotor has pulled into alignment with them as a result of windings 40, 41, and 42 having been energized per line 3 of FIG. 17 for a third step, it is poised for a repetition of step 1. A prototype model of this construction having an outside diameter of 2.0 inches, a length of 2.5 inches and 12 poles in stator and rotor for 10° steps was built. Under an average power drain of 5 watts this model demonstrated a stall torque of 30 ounce-inches with a temperature rise of 10°F. The electrical susceptance of end windings was altered to compensate for the difference between the permeability of their flux path and the path of centrally located windings, which difference is inherent with electromagnetic devices which are made to function in this open-ended fashion. In the test model, this adjustment was effected by a partial excitation to end windings at all times. This five-coil stepper motor, as all constructions presented in this invention, may utilize the advantage of laminating stator pieces according to the procedure described for FIG. 18. Lamination stacks would engulf windings that are excited together. That is, the legs of one stack would replace the poles on wafers 43 and 46 of FIG. 16, the legs of the next stack would replace wafers 44 and 47 and the legs of the third stack in progression would replace wafers 45 and 48. The unit may be wound for simple power connections as depicted in FIG. 28, having no need for polarity sense. The center winding is excited separately and for every step. The two inboard windings are made up of two coils each with connections as shown having one end of every continuous set tied to a common. A voltage source is applied to lines 1, 2, and 3 per FIG. 17 for three step or three phase operation.

I claim:

1. In a motor apparatus of the type described in which two stator elements are adapted to be periodically connected to an electrical voltage source for rotatably coercing across an annular air gap a coaxially mounted cylindrical rotor whose lengthwise splined poles extend through both elements, are equally spaced peripherally and are permanently charged with alternate north and south magnetic fields, each said element comprising a bobbin-styled winding whose coil axis is inline with the motor's central axis and flux-carrying stator iron pieces which surround said winding on its end faces and on its side away from said rotor, said stator iron pieces incorporating a full complement of pole lands and spaces of equal arcs extending radially at their two end-face sections toward said rotor whose poles number substantially less than stator lands in order that energizing the winding of either element emanates a toroidally-shaped flux circuit to selectively gate fluxes at the two rings of stator lands that surround said element toward circumferentially overlapping rotor poles, the coaction of field strengths of said rotor poles with those instant to said rings of stator lands whose polarities depend on the direction of electric current through the winding between them in producing a torque that aggregates uniformly at every rotor pole around the air gap and the resulting step movement of said rotor amounting to an arc equal to one-quarter that subtended by a stator land and space together adding to an arc of one full land and space after a cycle of four consecutive steps in the same direction, of which the first is marked by the passage of current in one direction through the winding of one element whose surrounding two rings of stator lands are oriented circularly one-half land pitch apart, the second by the passage of current in the same direction through the winding of the other element whose surrounding rings have their lands staggered one-half land pitch in the same manner as the one element but also oriented one-quarter land pitch in the direction of rotor movement from the corresponding rings in the one element, the third by the passage of current in the opposite direction through the winding of the one element and the fourth by the passage of current in the opposite direction through the winding of the other element and so on to impress sustained rotation through further step movement cycles and to permit rotation in the opposite direction by directing the same currents through the windings in reverse order.

2. In an apparatus as set forth in claim 1, the attraction and repulsion of successive rotor poles by stator lands as said rotor poles overlap said stator poles respectively by an arc away from desired rotor movement and by an arc toward said movement first in a regular pattern of two rotor poles and notches facing every three stator poles and notches as viewed along the air gap and then in another regular pattern of fewer rotor poles such that, when the bisector of any rotor pole is made to align circularly with one edge of a stator pole, bisectors of its neighboring rotor poles will align with the other edge of stator poles, there occuring $n$ ineffectual stator poles between said rotor pole and its neighbor on one side and $n-1$ ineffectual stator poles between said rotor pole and its neighbor on the other side, with $n$ being any integer, in order that an odd number greater than one of stator poles with their notches concurs circumferentially with the arc subtended between like sections of adjacent rotor poles of the same polarity.

3. In an apparatus as set forth in claim 2, the addition of rotor poles or teeth and notches having a pitch that matches stator pieces alongside and integral with existing rotor magnet pole salients by equal numbers in order to broaden the effective arc surfaces of said rotor pole salients.

4. In an apparatus as set forth in claim 2, the use of a rotor construction in which poles are formed of ferromagnetic strips running the rotor's length and attaching by one end each alternately to the side faces of a centrally located right cylindrical permanent magnet core whose lines are oriented lengthwise in order that said strips present pole surfaces to the air gap that are at once permeable to pulsating fluxes and charged permanently in alternate succession around the rotor's periphery with north and south fields.

5. In a motor apparatus as set forth in claim 2 in which a plurality of C-shaped iron pieces acting as stator flux-carrying pieces are assembled by overlapping pairs in axial planes slightly askew of the machine's central axis around the periphery of three axially aligned bobbin-styled windings wherein the open ends of said C-pieces accost the rotor and form rings of pole lands and intervening spaces around and between windings such that a first ring of lands at the outer side of one outer winding comprises near legs of a first group of C-pieces assembled parallel to each other in a circle, a second ring of lands between sides of said one outer winding and the middle winding comprises near legs of a second group of C-pieces which are also assembled parellel to each other overlapping said first group and extend toward said rotor one-quarter stator land pitch ahead of the near legs of said first group as measured around the air gap in the direction of rotor movement, a third ring of lands between sides of said middle and other outer windings comprises the far legs of said first group which extend toward said rotor one-half land pitch behind said first group's near legs and a fourth ring of lands at the outer side of said other outer winding comprises the far legs of said second group which extend toward sad rotor one-quarter land pitch behind of said first group's near legs in order that said rotor is made to step four periodic times by the passage of electric current first through said one outer winding in one direction, second through said other outer winding in the same direction, third through said one outer winding in the opposite direction and fourth through said other outer winding in the opposite direction.

6. In a motor apparatus as set forth in claim 5 in which C-shaped pieces surround outer and middle and then middle and other outer windings and are assembled around the periphery of said windings so that their legs end in stator pole lands facing the rotor, the fashioning of said C-pieces out of thin-gauge silicone sheet steel laminations which are all in the full shape of the C and which are cemented together to a height required for the arc width of stator lands in order to increase efficiency of operation by reducing eddy currents at relatively high frequencies.

7. In an apparatus as set forth in claim 5, the extension of backs of C-shaped iron pieces to form F-shaped pieces covering all three windings on their sides away from the rotor, which F-pieces are laid alternately in place to make up the stator iron array developed in claim 5, the inclusion of thin straight shading strips of non-magnetic but electrical conducting material such as copper lying on the side of windings away from said rotor and thus flatly between every said F-piece and extending also over all three windings, said strips incorporating holes along their length so that energizing one outer winding will cause some flux to close a path that starts with the near legs of the first group of F-pieces at the outer side of said one outer winding, travelling partially along the regular path in the backs of said first group astride said one outer winding, then jumping traversely through said holes in said strips to proceed further along the extended backs of adjacent F-pieces in the second group to emerge toward the rotor at either ring of lands on the legs of said second group to return through air gaps and along rotor poles, said flux thereby undergoing a time phase delay on passing through shorted turns provided by said holes in said shading strips so that field strengths of lands on the legs of said second group give rise to a torque to said rotor secondarily and distinct from that torque due to field strengths of lands on the legs of said first group in order that said secondary torque contributes the second and fourth steps of four-step self-sustaining rotor movement cycles in one direction as said energizing of said one outer winding is supplied by a periodic bipolar pulsating current, and means for energizing the other outer winding in like manner with the same current for rotor movement in the opposite direction.

8. In a motor apparatus as set forth in claim 5, augmenting torque exerted by the rotor with the energizing of the middle winding together with outer windings in identical sequence with similar currents of the same polarities to accomplish four-step sustained rotor movement cycles in either direction.

9. In an apparatus as set forth in claim 2, the forming of a motor construction in which rotor poles extend axially in both directions from a central point of attachment to alternate side faces of a magnet core with lengthwise oriented lines equally over and around stator elements whose poles and notches face radially outward toward the air gap and rotor.

10. In an apparatus as set forth in claim 2, the forming of flux-carrying stator pieces that surround co-energized windings to incorporate a full complement of poles that index the rotor in determining steps per revolution and the structuring of said stator pieces apart from windings to facilitate interchangeability.

* * * * *